June 3, 1930.  H. E. WINCH  1,761,165
ROAD AND WALK CONSTRUCTION
Filed June 8, 1928
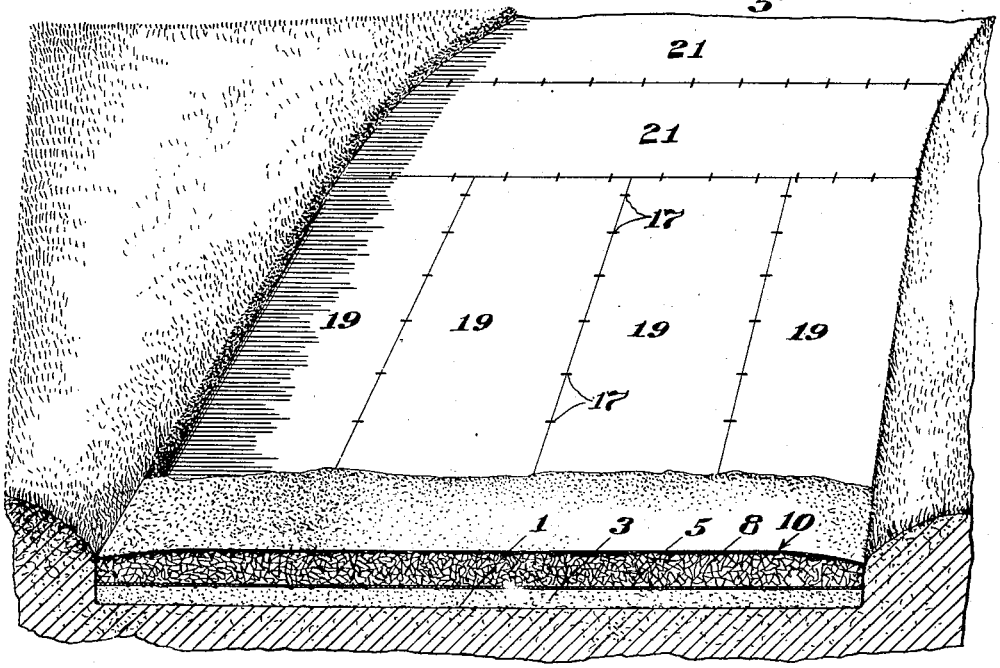
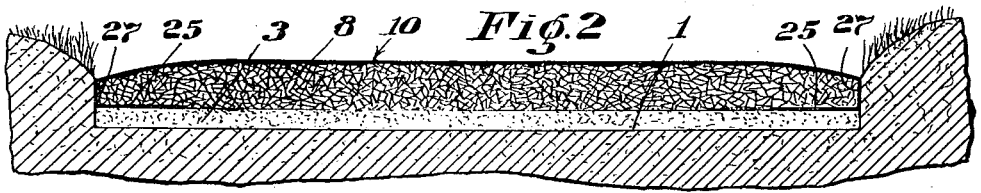
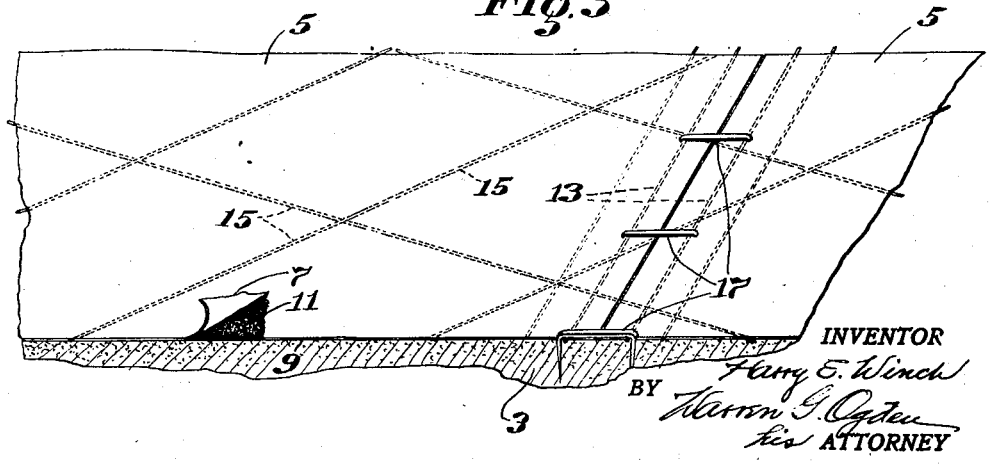

Patented June 3, 1930

1,761,165

UNITED STATES PATENT OFFICE

HARRY E. WINCH, OF MEDWAY, MASSACHUSETTS, ASSIGNOR, BY MESNE ASSIGNMENTS, TO THE RUBEROID CO., OF BOUNDBROOK, NEW JERSEY, A CORPORATION OF NEW JERSEY

ROAD AND WALK CONSTRUCTION

Application filed June 8, 1928. Serial No. 283,803.

This invention relates to an improved road and walk construction and is particularly, but not essentially, useful in the construction of paths and driveways on private estates usually formed without a hardened or impervious surface.

It has been found that where roads and walks are so constructed as to include several layers of stone or other material crushed to varying size, providing interstices between the particles, that grass and weeds will creep up therethrough and disfigure the roads and walks. Also, edges of lawn bordering such ways are liable to spread and encroach upon the ways, thereby disfiguring their appearance. As a consequence, it has been necessary frequently to manually dig up the grass and weeds, but even this process does not eliminate them since in course of time more grass and weeds will grow. As a substitute acid has been used as an eradicator, but this also involves much labor. Thus, considerable time, labor and expense have had to be spent in keeping the roads and walks free from the disfiguring grass and weeds.

The object of the present invention is to provide a construction in which this objectionable growth of weeds in roads and walks is effectively and permanently prevented. Accordingly the invention contemplates the provision of means for preventing the growth of grass or weeds through the layers that compose the road or walk that is built into the construction and forms a permanent part thereof. This feature of the invention comprises the provision of a layer of material, such as specially prepared paper, as a constituent element of the construction, which completely shuts off any seed germinated earth from the surface portions of the road or walk and thus preserves the surface from disfigurement.

The character of the invention may be best understood by reference to the following description taken in connection with the accompanying drawing, wherein:

Fig. 1 is a perspective view of a road or walk construction built in accordance with the invention;

Fig. 2 is a view, in vertical section, through a construction in which the novel feature of the invention is used to prevent growth of grass and weeds merely at the side margins of the road or walk; and Fig. 3 is a perspective view showing a type of reinforced paper which may be used.

In the embodiment of the invention shown in Fig. 1 of the drawing, 1 designates a bed of suitable dimension. Spread on this bed is a bottom layer 3 which may be of cinders, crushed rock, or other suitable material. Superposed on this bottom layer, in the preferred manner of using the invention, is a layer 5 of waterproof paper which may desirably comprise two layers 7 and 9 of strong, tough paper such, for example, as what is known to the trade as "Kraft" paper. Between these layers is a layer 11 of black asphaltum, although other suitable weather and moisture resisting material may be used. To insure long life it is desirable to saturate the paper layers with black asphaltum. When the kraft paper is saturated with asphaltum it will not absorb water, which tends to rot and destroy it. Reinforcing filaments may be provided between the paper layers and embedded in the black asphaltum layer. In the present instance, filaments 13 are provided adjacent longitudinal edges of the paper strip, and diagonally crossing filaments 15 may be provided between the paper layers further to reinforce the same. These filaments may be of cotton, jute, wire or other suitable material.

The waterproof paper layer thus constructed may be cut into strips of suitable lengths, and these strips may extend transversely or longitudinally of the road or walk bed as desired. For straight stretches preferably the paper strips will extend longitudinally of the bed, and one or more of these strips will be laid to cover the width of the bed as required. To secure the strips to the bottom layer 3 or other underlying layer, staples 17 preferably five or six inches long, may be driven through the strips at suitable intervals, the heads being of such width that the staples will straddle the marginal filaments 13 as best shown by Fig. 3.

Thus, the marginal filaments will resist tear or rupture of the strips at their points of anchorage.

In applying the strips to roads or walks having straight and curved stretches, longitudinal strips 19 (Fig. 1) may be used for the straight stretches, and transverse strips 21 may be used for the curved stretches, since the latter will lend themselves more readily thereto.

In one manner of constructing the road or walk, the paper layer 5 may have a layer 8 of crushed rock or other suitable construction material spread thereon, and on the latter layer there may be spread a layer 10 of granite dust or other surfacing material that will bind with the crushed rock.

In some instances it may be found sufficient to provide paper strips 25 (Fig. 2) at the margins of the road or walk without laying paper strips over the entire width thereof. To resist encroachment of the grass upon margins of the road or walk, the marginal strips 25 may have upstanding walls 27. The paper layer formed by the strips 19 and 21 (Fig. 2) may also have such walls, if required or desired, along the margin of the bed 1.

While the reinforcement shown in Fig. 3, comprising the diagonally crossing reinforcing filaments, is not essential, still it is highly effective to divide the paper into squares or areas bounded by the reinforcements so that if a rock should rupture the paper in such an area, tearing of the paper will be prevented beyond the boundaries provided by the crossed filaments.

The term "layer", as used herein with reference to the paper that is impervious to the growth of grass and weeds, is to be construed as inclusive of a single strip of the paper, that may or may not have its margin upturned as shown in Fig. 2, and may or may not be the complete width of the way, as well as to several strips laid edge to edge within the prepared bed. Good results have been obtained from placing the paper layer on the bottom layer of construction material, but this location is not essential.

It will be understood that the invention is not limited to the specific embodiment shown, and that various deviations may be made therefrom within the skill of the artisan without departing from the spirit and scope of the appended claims.

What is claimed as new is:—

1. Road and walk construction built of a plurality of layers comprising a layer formed of sheets of paper having an asphaltum layer between the paper sheets and reinforcing filaments embedded in the asphaltum layer, and a layer of construction material spread over the paper-and-asphaltum layer.

2. Road and walk construction comprising a bed, a plurality of layers of construction material in the bed including a layer of paper strips laid edge to edge in the bed, each strip having reinforcing filaments extending longitudinally and adjacent edges thereof, and staples driven through margins of adjacent strips into the underlying material and straddling longitudinal filaments of said strips.

3. Road and walk construction comprising a bed and layers of construction material within the bed including a paper layer having diagonally crossing reinforcing filaments therein underlying a layer of construction material.

In testimony whereof I affix my signature.

HARRY E. WINCH.